US011209581B2

United States Patent
Blum et al.

(10) Patent No.: US 11,209,581 B2
(45) Date of Patent: Dec. 28, 2021

(54) TECHNIQUES FOR SELECTIVE VIEWING OF PROJECTED IMAGES

(71) Applicant: Universal City Studios LLC, Universal City, CA (US)

(72) Inventors: Steven C. Blum, Orlando, FL (US); Brian Birney McQuillian, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/796,452

(22) Filed: Feb. 20, 2020

(65) Prior Publication Data

US 2020/0400867 A1    Dec. 24, 2020

Related U.S. Application Data

(60) Provisional application No. 62/863,622, filed on Jun. 19, 2019.

(51) Int. Cl.
   *G03B 21/20*    (2006.01)
   *G02B 5/20*    (2006.01)
   (Continued)

(52) U.S. Cl.
   CPC ........... *G02B 5/208* (2013.01); *G02B 27/017* (2013.01); *G03B 21/12* (2013.01); *G03B 21/2006* (2013.01)

(58) Field of Classification Search
   CPC .... G03B 21/12; G03B 21/132; G03B 21/134; G03B 21/145; G03B 21/2006;
   (Continued)

(56) References Cited

U.S. PATENT DOCUMENTS 5,648,789 A    7/1997    Beadles et al.
6,005,536 A    12/1999    Beadles et al.
(Continued)

FOREIGN PATENT DOCUMENTS

EP    1185142 A2    3/2002
WO    2009083191 A1    7/2009

OTHER PUBLICATIONS

Rood, Rachael; "New Closed-Captioning Glasses Help Deaf Go Out to the Movies," heard on All Things Considered, May 12, 2013, https://www.npr.org/sections/alltechconsidered/2013/05/12/183218751/new-closed-captioning-glasses-help-deaf-go-out-to-the-movies.

(Continued)

*Primary Examiner* — Sultan Chowdhury
(74) *Attorney, Agent, or Firm* — Fletcher Yoder P.C.

(57) ABSTRACT

An entertainment enhancement system includes an infrared projection system configured to output an infrared image to a target surface. The infrared projection system includes a controller configured to coordinate projection of the infrared image with a separate action by generating instructions for projecting the infrared image based on data received by the controller indicative of an active status of the separate action and an infrared emitter configured to receive the generated instructions and emit the infrared image to the target surface. The system also includes a viewing device configured to be wearable by a user. The viewing device includes at least one lens and a filter assembly configured to shift the infrared image from an infrared frequency to a visible light frequency such that the infrared image is viewable on the target surface via the viewing device.

20 Claims, 5 Drawing Sheets

(51) Int. Cl.
*G02B 27/01* (2006.01)
*G03B 21/12* (2006.01)

(58) Field of Classification Search
CPC .......... G03B 21/2013; G03B 21/2033; G03B 21/2053; G02B 5/32; G02B 5/208; G02B 5/3025; G02B 27/017; G02B 27/0101; G02B 27/0172; G02B 27/0916; G02B 27/1006
See application file for complete search history.

(56) References Cited

U.S. PATENT DOCUMENTS

| | | | |
|---|---|---|---|
| 6,771,349 B2 | 8/2004 | Sitrick et al. | |
| 6,811,267 B1 | 11/2004 | Allen et al. | |
| 9,013,671 B2 | 4/2015 | Huber et al. | |
| 9,990,777 B2 | 6/2018 | Bradski | |
| 10,360,419 B1* | 7/2019 | Yeh | G06K 19/0717 |
| 2002/0101537 A1 | 8/2002 | Basson et al. | |
| 2004/0032379 A1 | 2/2004 | Price et al. | |
| 2005/0108026 A1 | 5/2005 | Brierre et al. | |
| 2007/0216868 A1 | 9/2007 | Cashin et al. | |
| 2010/0100581 A1 | 4/2010 | Landow et al. | |
| 2013/0141421 A1 | 6/2013 | Mount et al. | |
| 2013/0342813 A1* | 12/2013 | Wang | H04N 13/332 353/7 |
| 2015/0190726 A1 | 7/2015 | Frolov | |
| 2016/0048203 A1 | 2/2016 | Blum et al. | |
| 2017/0255291 A1* | 9/2017 | Hinson | G03B 21/145 |
| 2020/0120306 A1* | 4/2020 | Perelli | H04N 9/3141 |

OTHER PUBLICATIONS

PCT/US2020/037786 International Search Report and Written Opinion dated Sep. 11, 2020.

* cited by examiner

TECHNIQUES FOR SELECTIVE VIEWING OF PROJECTED IMAGES

CROSS-REFERENCE TO RELATED APPLICATIONS

The present application claims the benefit of U.S. Provisional Application No. 62/863,622, entitled "Techniques For Selective Viewing Of Projected Images" and filed Jun. 19, 2019, the disclosure of which is incorporated herein by reference for all purposes.

BACKGROUND

The present disclosure relates generally to the field of amusement parks. Specifically, embodiments of the present disclosure are related to techniques for selective viewing of projected messages and/or images via a viewing device in an amusement park such that the projected messages and/or images are not visible to guests without the viewing device.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Theme park or amusement park attractions have become increasingly popular, and various amusement park attractions have been created to provide guests, both domestic and foreign, with unique immersive experiences. Oftentimes, the unique immersive experience includes dialogue from various characters of an amusement park attraction. However, some domestic and foreign guests may not understand the dialogue, causing them to miss part of the unique and immersive experience. Accordingly, it is now recognizable that it is desirable to improve these amusement park attractions.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, an entertainment enhancement system includes an infrared projection system configured to output an infrared image to a target surface. The infrared projection system includes a controller configured to coordinate projection of the infrared image with a separate action by generating instructions for projecting the infrared image based on data received by the controller indicative of an active status of the separate action and an infrared emitter configured to receive the generated instructions and emit the infrared image to the target surface. The system also includes a viewing device configured to be wearable by a user. The viewing device includes at least one lens and a filter assembly configured to shift the infrared image from an infrared frequency to a visible light frequency such that the infrared image is viewable on the target surface via the viewing device.

In accordance with an embodiment, an entertainment enhancement system includes a display system having a display surface. The display system is configured to display a visible light image on the display surface in a visible spectrum. The system also includes an infrared projection system configured to output an infrared image to the display surface. The infrared projection system includes a controller configured to generate instructions for projecting the infrared image in coordination with the visible light image based on input from the display system, and an infrared emitter configured to receive the generated instructions and emit the infrared image to the display surface. The infrared emitter emits the infrared image at frequencies outside the visible spectrum and not at frequencies in the visible spectrum. The system further includes a viewing device configured to be wearable by a user. The viewing device includes at least one lens and a filter assembly configured to shift the infrared image from an infrared frequency outside the visible spectrum to a visible light frequency in the visible spectrum. The shifted infrared image and the visible light image are viewable on the display surface through the at least one lens.

In accordance with an embodiment, a method includes the step of generating instructions for projection of an image based at least in part on an input. The method also includes the step of emitting light at one or more frequencies outside of a visible range to form the image on a target surface based at least in part on the generated instructions. The target surface is disposed within an amusement park, and the image includes a message for at least one guest of an amusement park. Moreover, the method includes the step of providing a viewing device having at least one lens to the at least one guest of the amusement park. A filter assembly of the viewing device is configured to shift the image from the one or more nonvisible frequencies to one or more visible light frequencies such that the image is viewable on the target surface through the at least one lens via the filter assembly of the viewing device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
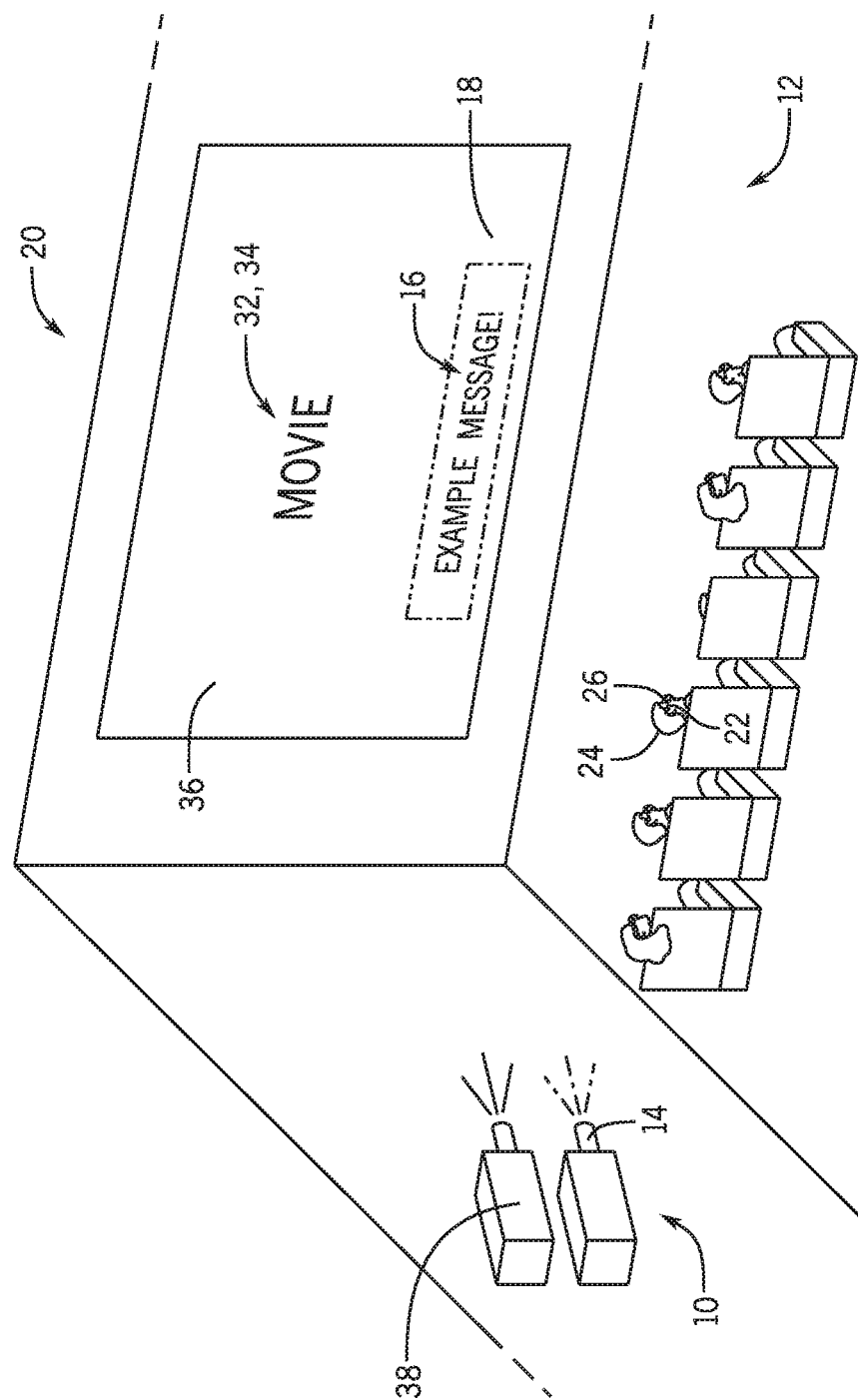
FIG. 1 is a perspective view of an embodiment of an infrared projection system in an amusement park attraction, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Theme park or amusement park attractions have become increasingly popular, and various amusement park attractions have been created to provide guests, both domestic and foreign, with unique immersive experiences. Certain amusement park attractions incorporate show elements with dialogue. The dialogue may advance a story line associated with the amusement park attraction, provide instructions, or provide some other benefit to further the unique immersive experience of the amusement park attraction. However, some guests at the amusement park attraction, for various reasons, may not understand the dialogue causing them to miss an important aspect of the unique immersive experience of the amusement park attraction.

With this in mind, provided herein is a system and method for communicating the dialogue or other communications of the amusement park attraction to guests that are otherwise unable to understand the dialogue or other communications. Specifically, provided herein is a system and method for guests to view projected content on a target or display surface of a show element. The projected content may display the dialogue or other communications (e.g., subtitles) for the guests such that the guests that are unable to understand the dialogue or other communications may more fully participate in the unique immersive experience of the amusement park attraction. Additionally, as described in more detail below, the system and method may be incorporated in other aspects of the amusement park to improve overall communications to guests. In certain disclosed embodiments, the projected content is projected at a wavelength/frequency that is not visible to an unaided human eye. Accordingly, the projected content is not available or visible to those guests that do not have a viewing device. In this manner, subtitles or captions may be used to supplement content while not being a distraction to those guests who do not wish to see the subtitles. While certain embodiments of the disclosure are discussed in the context of infrared projection using infrared wavelengths (e.g., 700 nm to 1 mm wavelengths), it should be understood that other nonvisible wavelengths are contemplated, such as microwave wavelengths or ultraviolet wavelengths. In certain embodiments, the visible wavelength range may be between 380-700 nm having frequencies between 430-770 THz, and the disclosed projected or displayed images may be emitted outside of the visible wavelengths/frequencies such that the images are only visible after shifting via viewing devices to a visible spectrum (e.g., shifting to one or more wavelengths/frequencies within the visible range).

FIG. 1 is a perspective view of an embodiment of an infrared projection system 10 in an amusement park attraction 12. The infrared projection system 10 includes at least one infrared emitter 14 configured to output an infrared image 16 to a portion of a target surface 18. In some embodiments, the at least one infrared emitter 14 includes a plurality of infrared emitters configured to output the infrared image 16. The infrared image 16 may include graphics, words, numbers, symbols, or some combination thereof. For example, the infrared image 16 may include a text phrase (e.g., captions, translations, and secret or reward messages). In another example, the infrared image 16 may be a graphic such as a map of the amusement park 20. The infrared image 16 may not be visible to the human eye. Generally, infrared light is electromagnetic radiation having a frequency between about 430 THz to 300 GHz, which is lower than that of visible light (e.g., red light, green light, blue light, etc.) and undetectable by the human eye. The infrared emitter 14 may output the infrared image 16 at a frequency between 430 THz to 300 GHz (700 nm to 1 mm wavelengths). Further, the infrared emitter 14 (e.g., a light emitting diode) of the system 10 may not emit light in the visible spectrum such that the emitted infrared image 16 is not visible without the aid of a viewing device 22 in accordance with present embodiments. Accordingly, while certain portions of the infrared range may overlap with the visible spectrum, in embodiments of the disclosure, the infrared image may be emitted such that the infrared signal is within portions of the infrared range that are non-overlapping such that the infrared image is not visible to the unaided eye.

Guests or viewers may be provided with viewing devices 22 to view the infrared image 16. In some embodiments, the viewing devices 22 may be glasses configured to be worn by the guests 24. However, the viewing device 22 may be any suitable device (e.g., binoculars, telescope) having at least one lens 26. The viewing devices 22 may include a filter or filter assembly configured to shift the infrared image 16 from an infrared frequency to a visible light frequency such that the infrared image 16 is viewable on the target surface 18 through the at least one lens 26 via the filter assembly of the viewing device 22. The filter assembly may include passive filters, such as optical filters or material property-based filters incorporated into or on the lens 26 of the viewing device 22. Such filters may include materials that absorb light outside of a desired frequency band, materials that transmit light within a desired frequency band, and/or materials that interact with light within a desired frequency band such that infrared light is shifted to one or more visible frequencies. In an embodiment, the filter assembly may include quantum dots that operate to shift infrared light to visible light. The filter assembly may include photonics-derived passive filters or photoelectric devices that interact with infrared energy. The filter assembly may include active devices that combine active detectors (such as an infrared imaging device) with processing and software to analytically convert IR frequencies and intensities to visible light frequencies and intensities. It should be understood that the filter assembly may include one or more devices that shift light into the visible spectrum. In addition, while the filter assembly is discussed in the context of infrared frequencies, the filter assembly may additionally or alternatively operate to shift other non-visible frequencies into the visible spectrum passively or actively (e.g., computationally based on a detected signal). Further, the viewing device 22 may be transparent such that the guests may view the amusement park attraction 12 and other portions of the amusement park 20 in addition to the infrared image 16.

As set forth above, the infrared images 16 are output to the target surface 18 of the amusement park attraction 12. In the present embodiment, the target surface 18 of the amusement park attraction 12 is a movie screen. However, the target surface 18 may be any portion of the amusement park attraction 12. For example, the amusement park attraction 12 may include an animated figure configured to speak to the guests during the amusement park attraction 12. The infrared emitter 14 may be configured to output the infrared image 16 onto a portion of the animated figure or on a surface proximate the animated figure. As the infrared image 16 is only visible via the viewing devices 22, the infrared image 16 projected onto the target surface 18 of the amusement park attraction 12 will not be visible for other guests 24 of the amusement park attraction 12. Thus, the infrared image 16 is selectively viewable via the viewing device 22.

In some embodiments, a control system of the amusement park 20 or amusement park attraction 12 includes a display system configured to display a visible light image 32 on the target surface 18. The visible light image 32 is an image that may be viewable by the human eye. For example, in the illustrated embodiment, the visible light image 32 includes a movie 34 viewable on a projector screen 36. The control system of the amusement park attraction 12 may include a display system having a projector 38 configured to project the visible light image 32 onto the target surface 18 (e.g., projector screen 36). In some embodiments, the display system is configured to display the infrared image 16 on a screen of a television, monitor, cell phone, tablet, or computing device.

In some embodiments, the infrared image 16 is configured to overlay the visible light image 32. That is, the infrared image 16 may be configured to be viewable over the visible light image 32. For example, the infrared image 16 may include a message (e.g., subtitles) corresponding to the visible light image 32 projected onto the projector screen 36. The infrared emitter 14 may be configured to output the infrared image 16 onto the same target surface 18 as the visible light image 32 such that subtitles may be viewable over the movie 34 on the target surface 18 (e.g., projector screen 36). Moreover, the infrared images 16 may include other messages for the guests or viewers of the infrared images 16 that may be viewed over the visible light image 32.

In some embodiment, the infrared image 16 includes a supplemental message for the guests. The supplemental message may include bonus material that may be optionally viewed through the viewing device 22. For example, the supplemental message may include additional backstory for the movie 34, names of actors, etc. Although the supplemental message may enhance the unique immersive experience of the amusement park attraction 12 for some guests 24, the supplemental message may distract other guests. As such, the supplemental message may be selectively viewed through the viewing device 22 to not detract from the unique immersive experience of the other guests 24.

In another embodiment, the infrared image 16 includes a targeted message for at least one guest 24. The infrared projection system 10 may be configured to emit a plurality of infrared images 16 that are the same images 16 or that are different images 16 (e.g., different images relative to one another) to provide custom or tailored content. Each infrared image 16 may be output at a different frequency. Further, each infrared image 16 may correspond to a guest group.

The viewing device 22 associated with the at least one guest 24 may be configured to receive guest identification information corresponding to the at least one guest 24. The guest identification information may include guest preferences, guest ride history, personal data (e.g., age, height), or any other suitable information. Based on the guest identification information, the at least one guest 24 may be assigned to a corresponding guest group. The viewing device 22 associated with the at least one guest 24 may be configured to view a range of infrared frequencies that include the frequency of the infrared image 16 output for the corresponding guest group. The viewing device 22 may have a bandpass filter configured to block infrared frequencies outside of the range of infrared frequencies that include the frequency of the infrared image 16 output for the corresponding guest group. Thus, the at least one guest 24 may view the targeted message corresponding to their guest identification information.

Figure 2:
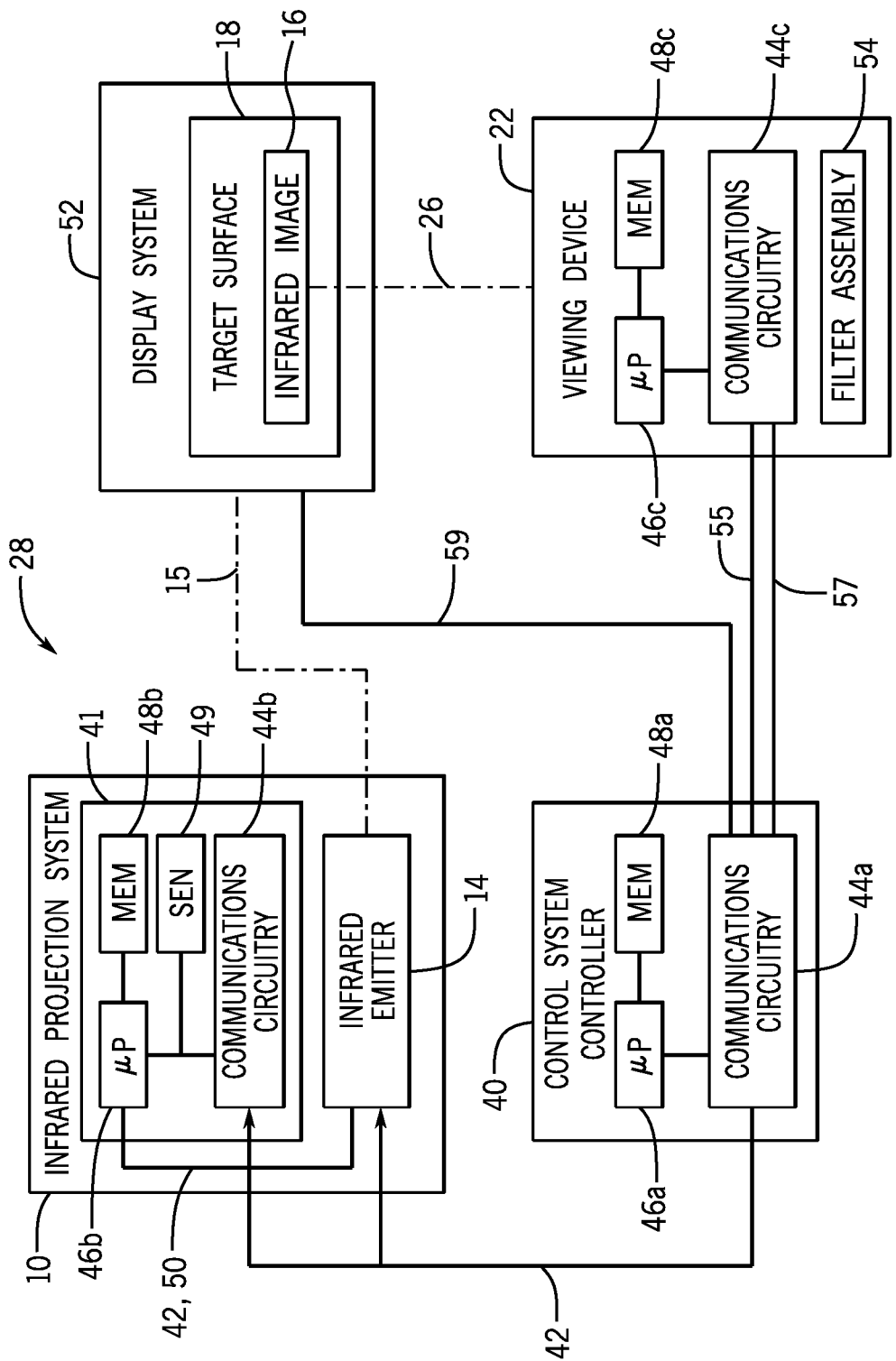
FIG. 2 is a block diagram of an embodiment of a control system for viewing projected infrared messages, in accordance with an aspect of the present disclosure.

FIG. 2 is a block diagram of an embodiment of a control system 28 for viewing projected infrared images 16. The control system 28 may include a control system controller 40 for the amusement park or amusement park attraction. The control system controller 40 may be configured to control ride vehicle systems, virtual queue systems, locker systems, or other systems of the amusement park or the amusement park attraction. Further, the control system controller 40 may be configured to generate instructions 42 for projecting the infrared images 16. In some embodiments, the system controller 40 is configured to coordinate projection of the infrared images 16 with a separate action by generating instructions 42 for projecting the infrared images 16 based on data received by the controller indicative of an active status of the separate action. The separate action may be a visible light image (e.g., a movie being displayed the display system 52) such that the system controller 40 is configured to generate instructions 42 for projecting the infrared images 16 in coordination with the visible light image based on input 59 from the display system 52. For example, the infrared images 16 may be coordinated with a movie, such that the infrared images 16 correspond to respective video and/or sound of the movie. Specifically, the infrared images 16 may display text corresponding to dialogue of the movie. In some embodiments, the separate action is movement of an animated figure. In some embodiments, the separate action corresponds to a location of the guest in the amusement park. For example, the viewing device 22 corresponding to the guest may output an activation signal 55 indicating an active status when the guest enters a room of the amusement park attraction (e.g., separate action). In some embodiments, the infrared projection system 10 includes a projection system controller 41 configured to generate the instructions 42 for projecting the infrared images 16.

The control system controller 40 and/or the projection system controller 41 may output the infrared image instructions 42. The control system controller 40 and/or the projection system controller 41 may include communication circuitry 44a, 44b such as antennas, radio transceiver circuits, and signal processing hardware and/or software (e.g., hardware or software filters, A/D converters, multiplexers amplifiers), or a combination thereof, and that may be configured to communicate over wireless communication paths via Infrared (IR) wireless communication, satellite communication, broadcast radio, Microwave radio, Bluetooth, Zigbee, Wifi, UHF, NFC, etc. In one embodiments, the communication circuitry 44a, 44b includes a plurality of IR transceivers disposed in the environment of the amusement park attraction. In some embodiments, the communication circuitry 44a, 44b includes a wired connection. The control system controller 40 and/or the projection system controller 41 may be configured to output the infrared image instructions 42 via the communication circuitry 44a, 44b.

The control system controller 40 may include a processor 46a and a memory 48a. The processor 46a may include one or more processing devices, and the memory 48a may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor 46a or by other processor-based devices (e.g., mobile devices). In some embodiments, the processor 46a is configured to determine the infrared image instructions 42 based on inputs 55, 59 received via the communications circuitry 44a, instructions stored on the memory 48a, a sensor 49, or some combination thereof. Further, in some embodiments, the memory 48a is configured to store instructions executable by the processor 46a to output the infrared image instructions 42.

In some embodiments, the communications circuitry 44b of the infrared projection system 10 may be configured to receive the infrared image instructions 42 from the control system controller 40 and generate relayed infrared image instructions 50 based on the infrared image instructions 42. In some embodiments, the infrared projection system 10 may also include a processor 46b and a memory 48b. The processor 46b may be configured to generate and output the infrared image instructions 42 and/or the relayed infrared image instructions 50 to the infrared emitter 14 based on the infrared image instructions 42, data stored on the memory 48b, or some combinations thereof. In some embodiments, the infrared emitter 14 may receive the infrared image instructions 42 directly from the communications circuitry 44a, 44b. The infrared emitter 14 may be configured to output the infrared image 16 based on the infrared image instructions 42 or the relayed infrared image instructions 50.

The infrared emitter 14 may output the infrared image 16 toward the target surface 18 of a display system 52. In some embodiments, the display system 52 is a television, computer, cell phone, tablet, or another suitable computing device having a respective screen. The target surface 18 may be a screen of the television, computer, cell phone, tablet, or another other suitable computing device. In some embodiments, the target surface 18 includes a projector screen, an amusement park sign, or any surface configured to display the infrared image 16.

In some embodiments, the guests may wear the viewing devices 22 during an amusement park attraction ride or in the amusement park, such that the guests may view 26 the infrared images 16. The viewing device 22 includes at least one lens and a filter assembly 54 configured to shift the infrared image 16 from an infrared frequency to a visible light frequency such that the infrared image 16 is viewable on the target surface 18 via the viewing device 22. In some embodiments, both the infrared image 16 and the visible light image are viewable on the target surface 18 through the at least one lens via the filter assembly 54. That is, the at least one lens may be transparent and does not block the at least one guest 24 from seeing through the at least one lens.

The viewing device 22 may include a processor 46c and a memory 48c. In some embodiments, the processor 46c and the memory 48c are configured to control the filter assembly 54 to shift the infrared image 16 from the infrared frequency to the visible light frequency such that the infrared image 16 is viewable on the target surface 18 via the viewing device 22. However, in some embodiments, the viewing device 22 does not include the processor 46c for processing the infrared images 16 or generated instructions. In some embodiments, the viewing device 22 does not include a controller having the processor 46c or the memory 48c. Instead, the viewing device 22 may have a filter assembly with a filter material configured to shift the infrared image 16 from the infrared frequency to the visible light frequency such that the infrared image 16 is viewable on the target surface 18 via the viewing device 22.

In some embodiments, the memory 18c is configured to store guest identification data. The processor 46c may be configured to determine a guest group based at least in part on the guest identification data. The processor 46c may be configured to send instructions to communications circuitry 44c of the viewing device 22 to output a guest group signal 57 to the control system controller 40. The control system controller 40 may be configured to output the infrared image instructions 42 for the infrared emitter 14 to emit the infrared image 16 within a frequency range corresponding to the guest group. The viewing device 22 may include a bandpass filter configured to filter infrared frequencies outside of the frequency range corresponding to the guest group. In some embodiments, the infrared emitter 14 may output a plurality of infrared images 16 at different electromagnetic frequencies based at least in part on respective guest group signals corresponding to various viewing devices 22 present at the amusement park attraction or the amusement park.

Figure 3:
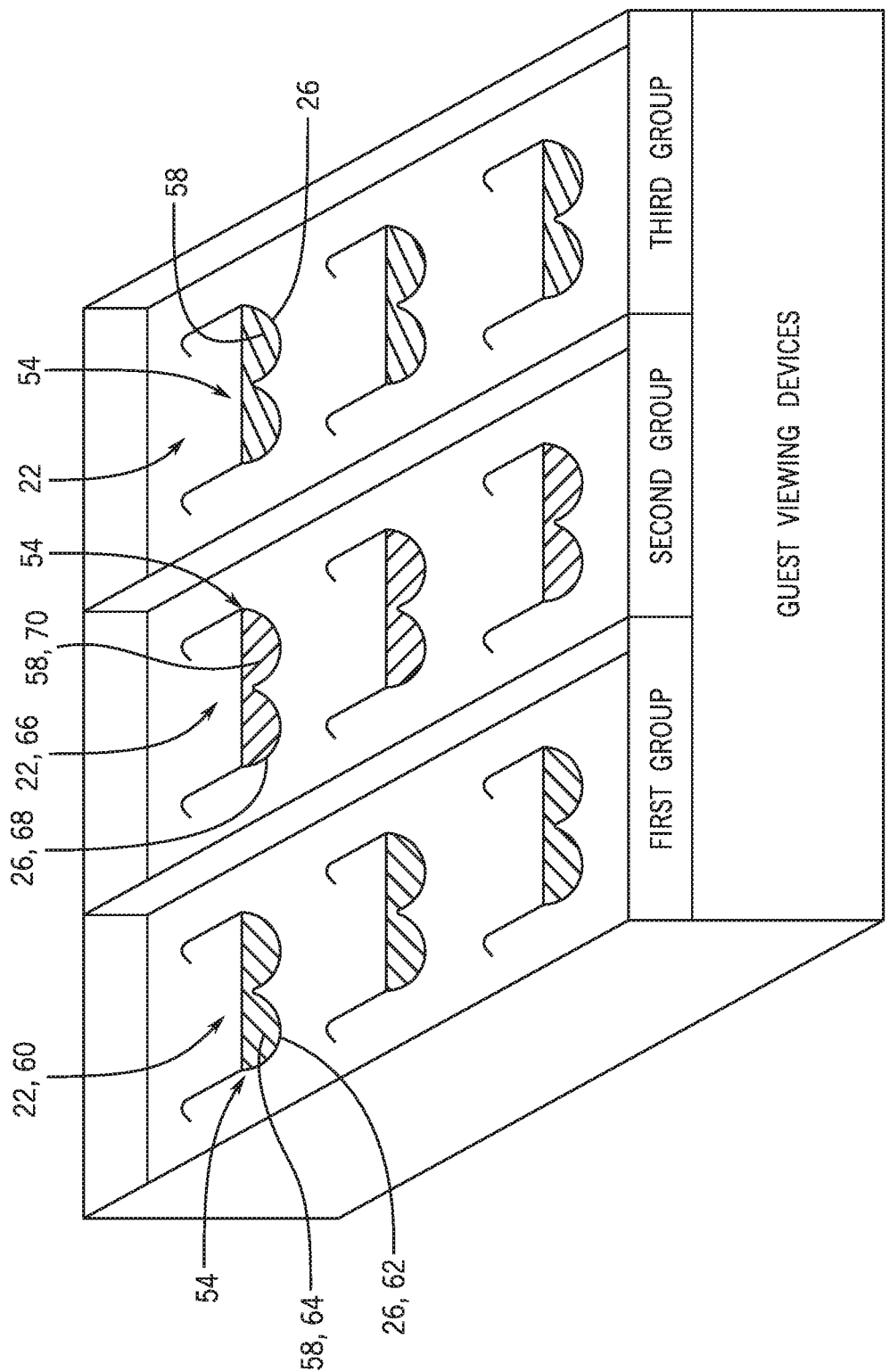
FIG. 3 is a perspective view of an embodiment of viewing devices, in accordance with an aspect of the present disclosure.

FIG. 3 is a perspective view of an embodiment of an assemblage of the viewing devices 22. In some embodiments, the viewing devices 22 may be provided to guests at an entrance of the amusement park attraction. The viewing devices 22 may include the filter assembly 54 having at least one filter 58 configured to view particular infrared images associated with a corresponding amusement park attraction. The at least one filter 58 may be coupled to the at least one lens 26 of the viewing device 22. In some embodiments, the amusement park attraction may have a dark environment. The at least one lens 26 of the viewing device may be a clear or substantially transparent lens to provide unobstructed viewing for the at least one guest in the dark environment. In another embodiment, amusement park attraction may include an outside environment. The viewing device 22 may be a pair of sunglasses with the at least one lens 26 having the at least one filter 58. That is, the at least one lens 26 may be additionally configured (e.g., include a layer) to filter or block ultraviolet light rays to provide more comfortable viewing for guests of the amusement park attraction. In some embodiments, the viewing devices 22 may be provided to the guests at an entrance of the amusement park, such that the guests may view infrared images throughout the amusement park.

In some embodiments, guests may be provided with the viewing devices 22 based on their guest identification information and/or guest group. A first viewing device 60 corresponding to a first guest group may have a first type of lens 62 configured to resolve the infrared image (e.g., first infrared image) such that the infrared image is viewable on the target surface. Additionally, the first type of lens 62 may have a first filter 64 configured to filter infrared frequencies outside of the frequency range corresponding to the first guest group. Further, a second viewing device 66 corresponding to a second guest group may have a second type of lens 68 configured to resolve an additional infrared image (e.g., second infrared image) such that the additional infrared image is viewable on the target surface. Also, the second type of lens may have a second filter 70 configured to filter infrared frequencies outside of the frequency range corresponding to the second guest group. For example, the first type of lens 62 may be configured to filter out frequencies outside of a 430 THz to 420 THz range and the second type of lens 68 may be configured to filter out frequencies outside of a 420 THz to 410 THz range. Thus, the first type of lens 62 may resolve the first infrared input image having a frequency of 425 THz, but will not resolve the additional infrared image having a frequency of 415 THz. That is, the infrared image is visible and the additional infrared image is not visible to the guest via the first viewing device 60 with the first type of lens 62. Whereas, the second type of lens 68 may resolve the additional infrared image having a frequency of 415 THz, but will not resolve the infrared image. Accordingly, the additional infrared image is visible and the infrared image is not visible to the guest via the second viewing device 66 with the second type of lens 68.

Figure 4:
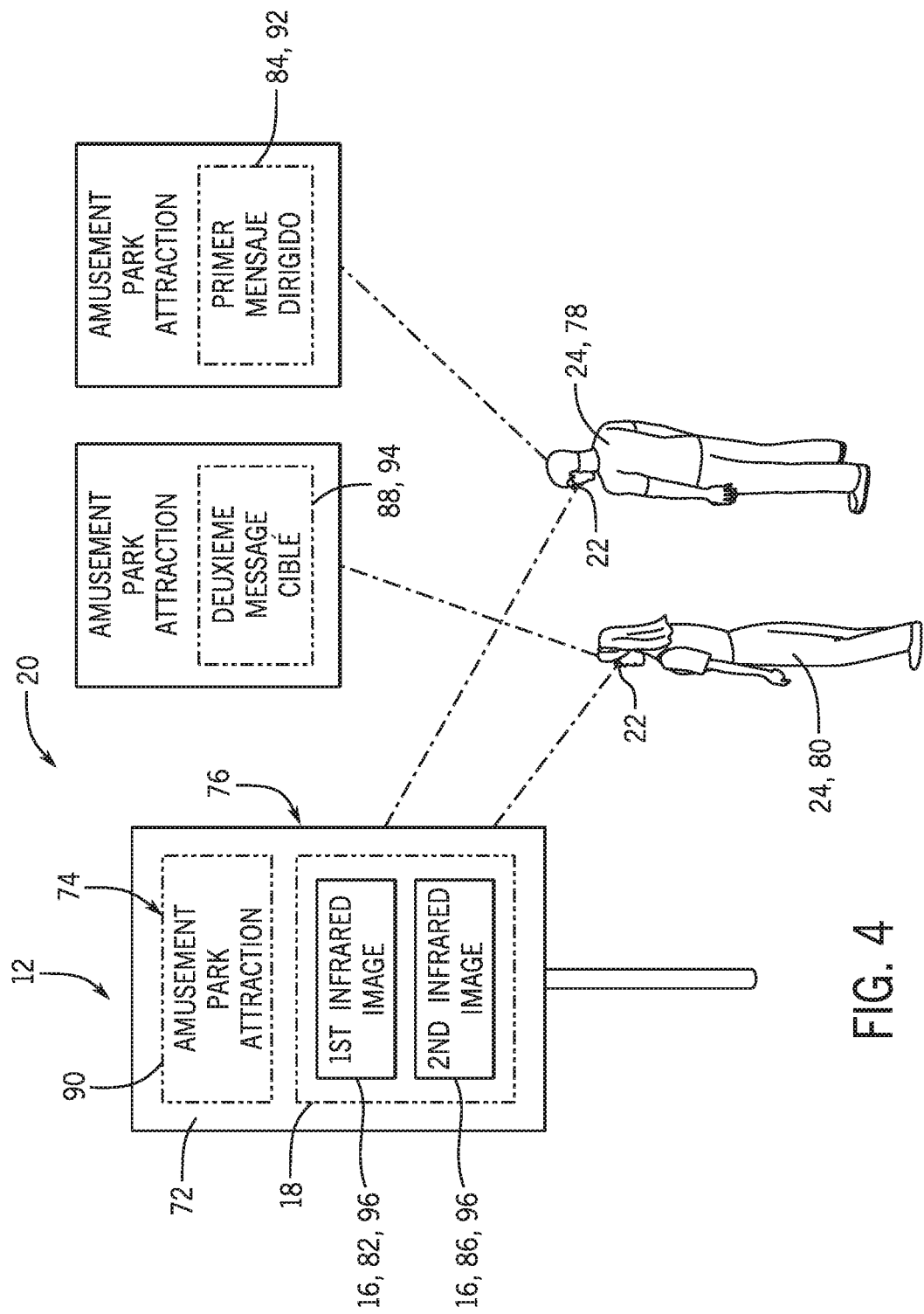
FIG. 4 is a perspective view of an embodiment of multiple targeted infrared messages projected on a sign for an amusement park attraction, in accordance with an aspect of the present disclosure.

FIG. 4 is a perspective view of an embodiment of multiple targeted infrared messages projected on a sign 72 for an amusement park attraction 12. In some embodiments, the amusement park 20 may include signs 72 or boards configured to convey information 74 (e.g., special events, directions, wait times) to guests 24 of the amusement park 20. However, the signs 72 or boards may generally convey the information 74 in a language that some guests 24 of the amusement park do not understand. The infrared emitter may be configured to output, to the target surface 18, an infrared image 16 of a translation of the information 74 to provide the guests 24 with the information 74 in a language that they understand. The target surface 18 may include at least a portion of the sign 72 or board of the amusement park attraction 12 or the amusement park 20. In some embodiments, the sign 72 may include a space (e.g., target surface 18) below the information 74 on the sign 72 for the infrared image 16. For example, the sign 72 may include a name of an amusement park attraction on a top portion 76 of the sign. The target surface 18 may be positioned below the name of the amusement park attraction. The infrared emitter may output an infrared image 16 of the translation of the name of the amusement park attraction in a language for the guest 24.

In some embodiments, the infrared emitter may be configured to output multiple infrared images of translations for each guest 24 proximate the sign 72. For example, a first guest 78 may only understand Spanish, a second guest 80 may only understand French, etc. Thus, the infrared emitter may be configured to output the first infrared image 82 (e.g., first targeted message 92) having a Spanish translation 84 of the name of the amusement park. Further, the infrared emitter may be configured to output the second infrared image 86 (e.g., second targeted message 94) having a French translation 88 of the name of the amusement park. The viewing devices 22 corresponding to the first guest 78 and the second guest 80 may be configured to output the guest identification information signal to the system controller. Based on the respective guest identification information for the first and second guest, the system controller may cause the infrared emitter to output the first infrared image 82 and the second infrared image 86. In some embodiments, when the second guest 80 leaves an area proximate the sign 72, the system controller may determine that the second infrared image 86 (e.g., the French translation of the name of the amusement park) is no longer necessary. Thus, the system controller may cause the infrared emitter to cease to output the second infrared image 86 when the second guest 80 leaves the area proximate the sign 72.

In some embodiments, the sign 72 may include a general information space 90 and the target surface 18. The target surface 18 may be positioned above, below, and/or around, the general information space 90. In the presently illustrated embodiment, the general information space 90 is disposed above the target surface 18. The processor may be configured to cause the infrared emitter to output the first targeted message 92 and the second targeted message 94 to the target surface 18. The infrared emitter may be configured to emit the first infrared image 92 and the second infrared image 94 at the target surface 18 at the same time.

In some embodiments, the first and second infrared images 92, 94 may convey different information 96 than the information 74 posted on the general information space. For example, the general information space 90 may include the name of the amusement park attraction. The first and second infrared images 92, 94 may include different images relative to one another and that include targeted information for guests 24 proximate the sign 72 for the amusement park attraction 12 or targeted game play information. The targeted information may include as a queue return time for a virtual queue for the at least one guest, wait times for a group size of the at least one guest's group, unauthorized ride notices based on the at least one guest's age, height, or other suitable targeted information. The targeted information may be based on the guest's identification information. Further, as set forth above, the targeted information may be translated into a particular language based on the guest's identification information. In an embodiment, the attraction 12 may be able to provide a different visual experience that is tailored (for example) to a particular guest location to give a proper 3D perspective or tailored to their game play to give a proper response to a guest action. In this manner, various surfaces of the attraction 12 may be arranged such that each guest 24 is provided specific images 16 that are different from the images 16 provides to another guest 24 standing in a different location or who has completed different game actions.

Figure 5:
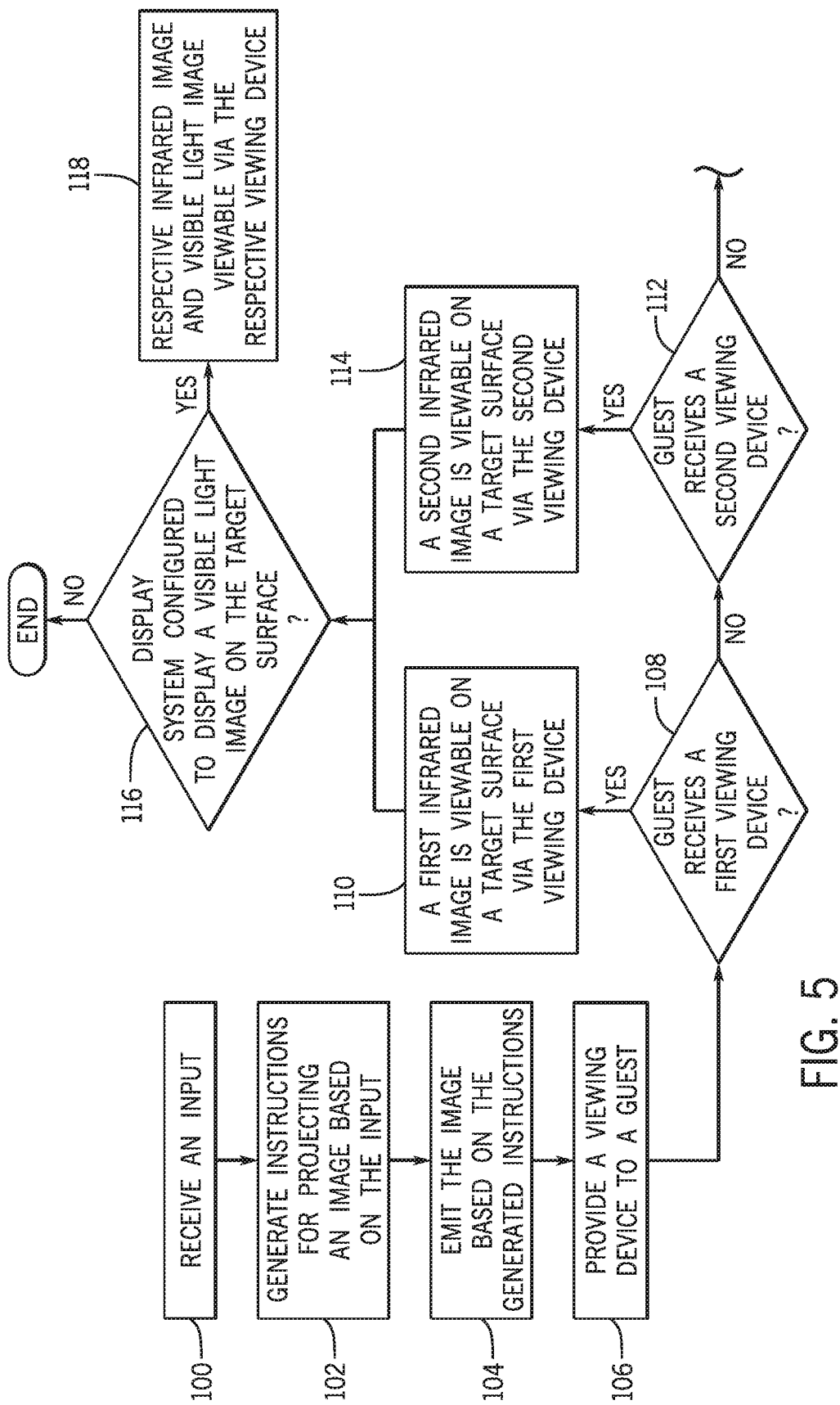
FIG. 5 is a flow chart of an embodiment of a method for viewing projected messages, in accordance with an aspect of the present disclosure.

FIG. 5 is a flow chart of an embodiment of a method for viewing projected infrared messages. The method includes the step of receiving an input (block 100). For example, the system controller may receive the input from the viewing device. The input may include the guest identification information. In another embodiments, the system controller may be configured to receive the input via the memory device of the system controller. The method further includes the step of generating instructions for projection of an image (block 102). The image may be generated based at least in part on the input. In some embodiments, the system processor of the system controller may be configured to generate the instructions based on the guest identification information received from the viewing device, as well as on instructions from the memory of the system controller. The system controller may transmit the generated instructions to the infrared emitter.

The method further includes the step of emitting the image, via the infrared emitter, to a target surface based at least in part on the generated instructions (block 104). The infrared emitter may be configured to emit light at one or more frequencies outside of a visible range to form the image on the target surface based in part on the generated instructions. For example, the generated instructions may include instructions to send a particular message. The infrared emitter may be configured to output the infrared image of the particular message to the target surface. The particular message (e.g., targeted message) may be for the at least one guest of the amusement park attraction. The target surface may be disposed within the amusement park or the amusement park attraction.

The method further includes the step of providing the viewing device having at least one lens to the at least one guest of the amusement park (block 106). The filter assembly of the viewing device may be configured to shift the image from one or more nonvisible frequencies to one or more visible light frequencies such that the image is viewable on the target surface through the at least one lens via the filter assembly of the viewing device. In some embodiments, the image is an infrared image. In some embodiments, the infrared image may only be viewable to particular guest devices. If the guest received a first viewing device (block 108), then the first infrared image may be viewable for the at least one guest through the first viewing device (block 110). Further, if the guest received a second viewing device (block 112), then the second infrared image may be viewable for the at least one guest through the second viewing device (block 114). A particular infrared message viewable for the guest may be dependent on a type of viewing device received.

Moreover, in some embodiments, the method includes the step of displaying a visible light image (e.g., movie, show) on the target surface (block 116). The viewing device may be configured such that the guest may view both the infrared image and the visible light image through the viewing device (block 118). For example, the viewing device may be configured to resolve the infrared image such that the guest may view infrared subtitles for a movie shown on a projector screen of an amusement park attraction while watching the movie.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An entertainment enhancement system, comprising:
an infrared projection system configured to output an infrared image to a target surface, wherein the infrared projection system comprises:
a controller configured to coordinate projection of the infrared image with a separate action by generating instructions for projecting the infrared image based on data received by the controller, the data indicative of an active status of the separate action; and
an infrared emitter configured to receive the generated instructions and emit the infrared image to the target surface; and
a viewing device configured to be wearable by a user, wherein the viewing device comprises at least one lens and a filter assembly, the filter assembly configured to shift the infrared image from an infrared frequency to a visible light frequency such that the infrared image is viewable on the target surface through the at least one lens of the viewing device.

2. The entertainment enhancement system of claim 1, wherein the infrared image comprises a supplemental message for the user.

3. The entertainment enhancement system of claim 1, wherein the controller is configured to generate additional instructions for projecting an additional infrared image in conjunction with the infrared image.

4. The entertainment enhancement system of claim 3, wherein the infrared image comprises a first targeted message for a first group of users, and wherein the additional infrared image comprises a second targeted image for a second group of users.

5. The entertainment enhancement system of claim 3, wherein the infrared image is emitted at a different electromagnetic frequency than the additional infrared image.

6. The entertainment enhancement system of claim 3, wherein the viewing device comprises a first viewing device configured to resolve the infrared image such that the infrared image is viewable on the target surface via the first viewing device, and comprising a second viewing device configured to resolve the additional infrared image such that the additional infrared image is viewable on the target surface via the second viewing device.

7. The entertainment enhancement system of claim 1, wherein the viewing device is associated with identification information corresponding to the user, wherein the infrared projection system is configured to detect the viewing device, determine the identification information associated with the viewing device, and output the infrared image based at least in part on the identification information.

8. The entertainment enhancement system of claim 1, comprising a sensor configured to detect the active status of the separate action, wherein the separate action is a movie being displayed or an animated figure moving.

9. An entertainment enhancement system, comprising:
a display system comprising a display surface, wherein the display system is configured to display a visible light image on the display surface in a visible spectrum;
an infrared projection system configured to output an infrared image to the display surface, wherein the infrared projection system comprises:
a controller configured to generate instructions for projecting the infrared image in coordination with the visible light image based on input from the display system; and
an infrared emitter configured to receive the generated instructions and emit the infrared image to the display surface in response to receiving the generated instructions, wherein the infrared emitter emits the infrared image at frequencies outside the visible spectrum and not at frequencies in the visible spectrum; and
a viewing device configured to be wearable by a user, wherein the viewing device comprises:
at least one lens; and
a filter assembly configured to shift the infrared image from an infrared frequency outside the visible spectrum to a visible light frequency in the visible spectrum, wherein the shifted infrared image and the visible light image are viewable on the display surface through the at least one lens.

10. The entertainment enhancement system of claim 9, wherein the display system comprises a projector, and wherein the projector is configured to project the visible light image onto the display surface.

11. The entertainment enhancement system of claim 9, wherein the infrared image is only visible on the display surface viewed with the viewing device.

12. The entertainment enhancement system of claim 9, wherein the infrared image comprises subtitles corresponding to the visible light image.

13. The entertainment enhancement system of claim 9, wherein the viewing device comprises glasses, wherein at least one lens of the glasses comprises a filter of the filter assembly.

14. The entertainment enhancement system of claim 13, wherein the at least one lens is transparent such that the visible light image is viewable through the at least one lens.

15. The entertainment enhancement system of claim 13, wherein the filter comprises a material configured to shift the infrared image from the infrared frequency outside the visible spectrum to the visible light frequency in the visible spectrum.

16. The entertainment enhancement system of claim 9, wherein the infrared emitter is configured to emit the infrared image within a predefined infrared frequency range, and wherein the filter comprises a bandpass filter configured to filter out infrared frequencies outside of the frequency range.

17. A method, comprising:
generating instructions for projection of an image based at least in part on an input;
emitting light at one or more frequencies outside of a visible range to form the image on a target surface based at least in part on the generated instructions, wherein the image comprises a message for at least one viewer of the image; and
providing a viewing device having at least one lens to the at least one viewer, wherein a filter assembly of the viewing device is configured to shift the image from the one or more frequencies outside of the visible range to one or more visible light frequencies such that the image is viewable on the target surface through the at least one lens via the filter assembly of the viewing device.

18. The method of claim 17, wherein the image comprises a targeted message for the at least one viewer.

19. The method of claim 17, comprising displaying a visible light image on the target surface, wherein the image is configured to overlay the visible light image.

20. The method of claim 17, wherein the light is emitted only at the one or more frequencies outside of the visible range.

* * * * *